(12) United States Patent
Kataoka et al.

(10) Patent No.: US 6,870,293 B2
(45) Date of Patent: Mar. 22, 2005

(54) MOTOR

(75) Inventors: Hisakazu Kataoka, Takefu (JP); Hiroshi Murakami, Suita (JP); Hideharu Hiwaki, Kadoma (JP); Sunao Hashimoto, Moriguchi (JP); Yasuharu Odachi, Kariya (JP); Hirohito Hayashi, Kariya (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/192,862

(22) Filed: Jul. 11, 2002

(65) Prior Publication Data

US 2003/0011272 A1 Jan. 16, 2003

(30) Foreign Application Priority Data

Jul. 16, 2001 (JP) .................................... 2001-214583

(51) Int. Cl.[7] ................................................. H02K 1/14
(52) U.S. Cl. ................. 310/199; 310/183; 310/156.47; 310/254
(58) Field of Search ............................. 310/208, 195, 310/199, 254, 156.47, 179, 156.01

(56) References Cited

U.S. PATENT DOCUMENTS

| | | | | |
|---|---|---|---|---|
| 1,934,981 A | * | 11/1933 | Johnson | 310/172 |
| 3,013,168 A | * | 12/1961 | Ellis | 310/166 |
| 3,334,255 A | | 8/1967 | Peters | 310/215 |
| 3,469,309 A | * | 9/1969 | Sagalow | 29/598 |
| 3,735,169 A | | 5/1973 | Balke et al. | 310/214 |
| 4,160,926 A | | 7/1979 | Cope et al. | 310/215 |
| 4,260,926 A | * | 4/1981 | Jarret et al. | 310/254 |
| 4,463,276 A | * | 7/1984 | Nakamura | 310/266 |
| 5,266,859 A | * | 11/1993 | Stanley | 310/216 |
| 5,649,349 A | * | 7/1997 | Greenway | 29/598 |
| 5,883,490 A | * | 3/1999 | Moreira | 318/807 |
| 6,218,753 B1 | * | 4/2001 | Asano et al. | 310/156.53 |
| 6,223,417 B1 | * | 5/2001 | Saban et al. | 29/598 |
| 6,454,549 B2 | * | 9/2002 | Shafer | 417/423.1 |
| 6,462,452 B2 | * | 10/2002 | Nakano et al. | 310/156.47 |

FOREIGN PATENT DOCUMENTS

| | | | |
|---|---|---|---|
| EP | 0 913 909 A1 | 5/1999 | |
| EP | 1 065 778 A3 | 1/2001 | |
| EP | 1 065 778 A2 | 1/2001 | |
| JP | 55053157 | 10/1978 | |
| JP | 57183251 | 4/1981 | |
| JP | 57183237 A | * 11/1982 | ............ H02K/1/14 |
| JP | 57208840 | 12/1982 | |
| JP | 11225481 | 2/1998 | |
| JP | 2000175380 | * 2/1998 | ............ H02K/1/14 |
| JP | 0343329 | * 12/1998 | ............ H02K/1/14 |
| JP | 2001218392 | * 2/2000 | ............ H02K/1/14 |
| JP | 200175380 A | 6/2000 | |

* cited by examiner

Primary Examiner—Darren Schuberg
Assistant Examiner—Heba Elkassabgi
(74) Attorney, Agent, or Firm—Parkhurst & Wendel, L.L.P.

(57) ABSTRACT

To provide a motor which can suppress vibration and noise during an operation of a concentrated winding motor and can achieve low vibration and low noise with high efficiency. Skew is formed on at least one of a stator (10) provided with concentrated windings and a rotor (20), and the windings (13—13) of different phases in a groove (19) for windings are brought into contact with each other directly or via an insulating material.

6 Claims, 11 Drawing Sheets

F I G. 4
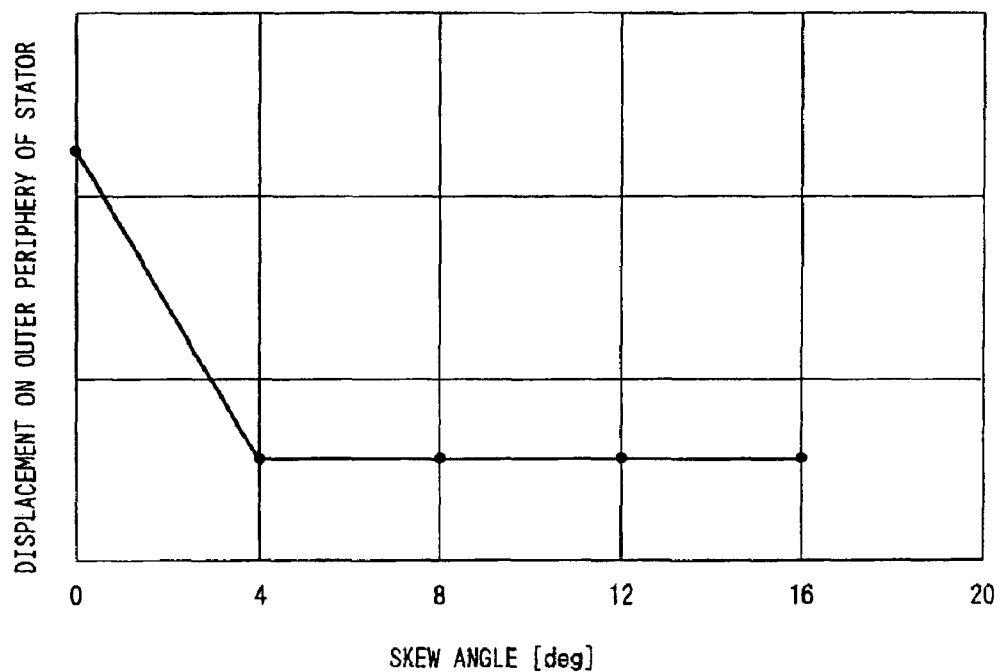

MOTOR

FIELD OF THE INVENTION

The present invention relates to a concentrated winding motor for realizing low noise and low vibration.

BACKGROUND OF THE INVENTION

Conventionally, a concentrated winding motor used for a compressor of an air conditioner, a refrigerator, and so on, is configured as shown in FIGS. 6 to 8.

The concentrated winding motor is constituted by a stator 60 and a rotor 80, which is rotatably supported inside the stator 60. The stator 60 of FIGS. 6 and 8 is formed by stacking stator-cores 61. The stator-core 61 is formed by teeth 62, each having a winding thereon, and a yoke 64, which is substantially annular and connects the outer peripheral surfaces of the teeth 62. On the ends of the teeth 62, teeth projecting tips 65 are formed so as to protrude in a peripheral direction along the internal diameter of the stator-core.

Windings provided the six teeth 62 formed on the stator-cores 61 are indicated by three-phase windings 63U, 63V, and 63W in FIG. 6 but the shapes of the three-phase windings 63U, 63V, 63W are not specifically shown in FIG. 6. To be specific, the windings are wound as shown in FIG. 7.

FIG. 7 is a sectional view taken along a line X–X' of FIG. 6. Windings 63 representing the three-phase windings 63U, 63V, and 63W are wound around the teeth 62 of the stator-cores 61 via insulating materials 67, each being composed of an insulator formed as a film or a resin.

The three-phase windings 63U, 63V, and 63W make star connection each other and produce 120°-rectangular wave driving, in which two of the three phases are simultaneously driven while being brought into excitation. Further, applied voltage is changed by PWM control.

Moreover, the stator-cores 61 having such shapes are stacked in a straight line along the axial direction without forming skew. Notches 66 formed on the outer periphery of the stator-cores 61 act as through holes between a shell 90 and the stator-cores 61 and act as passages of refrigerant in a state in which the stator 60 is shrink-fitted into the shell 90 of a compressor.

The rotor 80 is rotatably held in the stator 60 concentrically with the stator 60. The rotor 80 has permanent magnets 82 embedded into a rotor core 81. End plates (not shown) are placed on both ends of the rotor core 81, and a rivet (not shown) is passed through a through hole made in the rotor core 81 to be caulked, so that the end plates on the ends are fixed. Further, a shaft passes through a shaft hole 83.

Therefore, because of a rotating magnetic field generated by current applied to the three-phase windings 63U, 63V, and 63W that are provided on the stator 60, the rotor 80 is rotated by torque, which is generated by combining magnet torque and reluctance torque, centering around the shaft.

As described above, on the stator 60 formed by stacking in a straight line along the axial direction without forming skew, since attracting stress or repulsing stress increases between the adjacent teeth projecting tips 65, vibration is more likely to increase as compared with distributed windings. This is largely affected by vibration in a radius direction as well as vibration in a rotational direction.

Particularly in the case of PWM (Pulse Width Modulation) control and 120°-rectangular wave driving, in which only two of three phases are brought into excitation, vibration remarkably increases. This is because current applied to windings includes more harmonics as compared with sinusoidal driving. Besides, in 120°-rectangular wave driving, since current abruptly changes, strong exciting force is generated on the teeth projecting tips, thereby increasing vibration.

It has been conventionally known that the formation of skew is effective as a method for reducing irregularities of torque and reducing vibration. The formation of skew is not limited to a stator. For example, Japanese Patent Laid-Open No. 2000-175380 discloses that skew is formed on a rotor or both of a stator and a rotor. It is possible to reduce vibration generated on the concentrated winding motor shown in FIG. 6 by forming skew.

In the case where irregular torque is reduced by forming skew on a stator and a stator-core has ribs for forming teeth on the internal diameter of an annular ring for forming a yoke thereon, the ribs are inclined by the skew so as to reduce the occurrence of annular vibration. However, simply by forming skew on the stator, vibration cannot be completely eliminated. Further, it has been found that in the slightly generated annular vibration, windings stored in the same groove for windings in a non-contact state become mass, resulting in larger vibration.

DISCLOSURE OF THE INVENTION

The present invention has an object to suppress vibration and noise during an operation of a concentrated winding motor, and to provide a motor with high efficiency, low vibration and low noise.

In order to attain the above described object, in the present invention, skew is formed with a skew angle of not less than 4° nor more than $(120/Np)°$ on at least one of a rotor and a stator having concentrated windings, and windings of different phases are brought into direct contact with each other in a groove for windings.

With this configuration, it is possible to achieve an efficient motor which can suppress vibration and noise during an operation of a concentrated winding motor.

A motor according to aspect 1 of the present invention includes a stator which has a plurality of teeth radially formed at intervals in a circumferential direction on the inner periphery of an annular yoke, the interval serving as a groove for windings, and has concentrated windings provided on the teeth, and a rotor which is rotatably held to oppose against an inner periphery of the stator with a minimal gap therebetween, wherein skew is formed on at least one of the stator and the rotor, the windings of different phases are brought into contact with each other directly or via an insulating material in the groove for windings, and stress is applied to the windings and the teeth by this contact. With this configuration, the adjacent windings of different phases are brought into contact with each other, so that the strength of stator-cores can be improved and vibration on the windings can be suppressed or reduced.

A motor according to aspect 2 of the present invention is such that in aspect 1, after the concentrated windings are provided on the teeth of the stator, skew is formed on the stator, and thereby the groove for windings is reduced in width to bring the windings into contact to each other.

A motor according to aspect 3 of the present invention is such that in aspect 1, the rotor has permanent magnets embedded inside a rotor core. With this configuration, it is possible to effectively use magnetic torque resulted from the permanent magnet and reluctance torque resulted from saliency of the rotor.

A motor according to aspect 4 of the present invention is such that in aspect 1, when the number of poles of the rotor is Np, a skew angle formed in the stator is set at not less than 4° nor more than (120/Np)°. With this configuration, it is possible to suppress annular vibration on the stator and the rotor core.

A hermetic compressor according to aspect 5 of the present invention includes the motor of aspect 1. With this configuration, it is possible to realize a hermetic compressor with low vibration and low noise.

A hermetic compressor according to aspect 6 of the present invention is such that in aspect 5, HFC or a natural refrigerant is used as a refrigerant. With this configuration, it is possible to reduce environmental load.

A hermetic compressor according to aspect 7 of the present invention is such that in aspect 5, voltage applied to the winding of the motor is 50 volts or less. With this configuration, it is possible to realize a hermetic compressor which can perform battery drive with low vibration and low noise.

A refrigeration cycle according to aspect 8 of the present invention uses the hermetic compressor of aspect 5. With this configuration, it is possible to realize a refrigeration cycle with low vibration and low noise.

An automobile according to aspect 9 of the present invention includes an air conditioner having the refrigeration cycle of aspect 8. With this configuration, it is possible to realize an automobile with low vibration and low noise.

An automobile according to aspect 10 of the present invention is such that the motor of aspect 1 is mounted as an actuator and voltage applied to the winding of the motor is set at 50 volts or less.

BRIEF DESCRIPTION OF THE DRAWINGS

FIG. 4 is a characteristic diagram showing displacement on an outer periphery of the stator-cores and a skew angle according to the embodiment;

PREFERRED EMBODIMENTS

Hereinafter, an embodiment of the present invention will be discussed in accordance with FIGS. 1 to 5.

Figure 1:
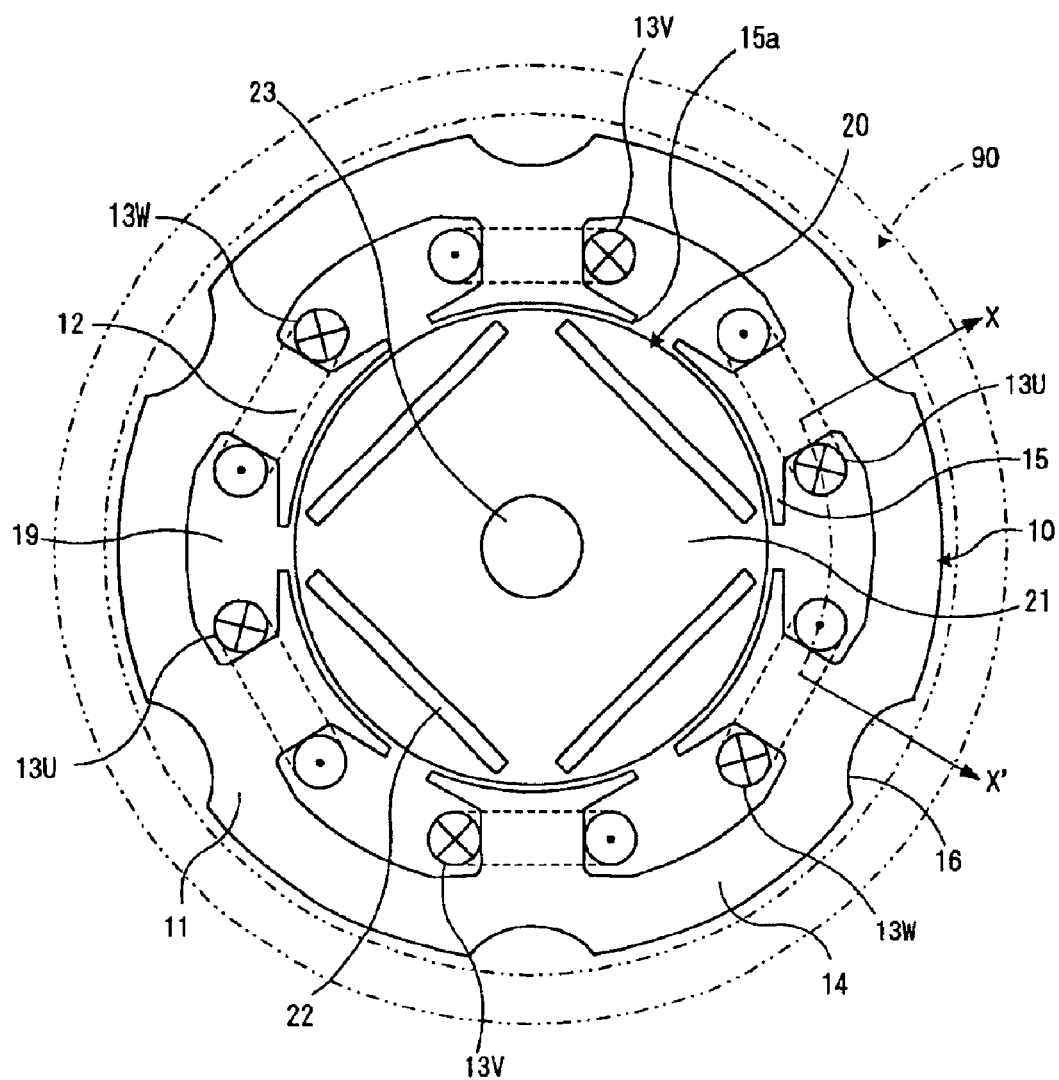
FIG. 1 is a sectional view of a concentrated winding motor according to an embodiment of the present invention.
Figure 2:
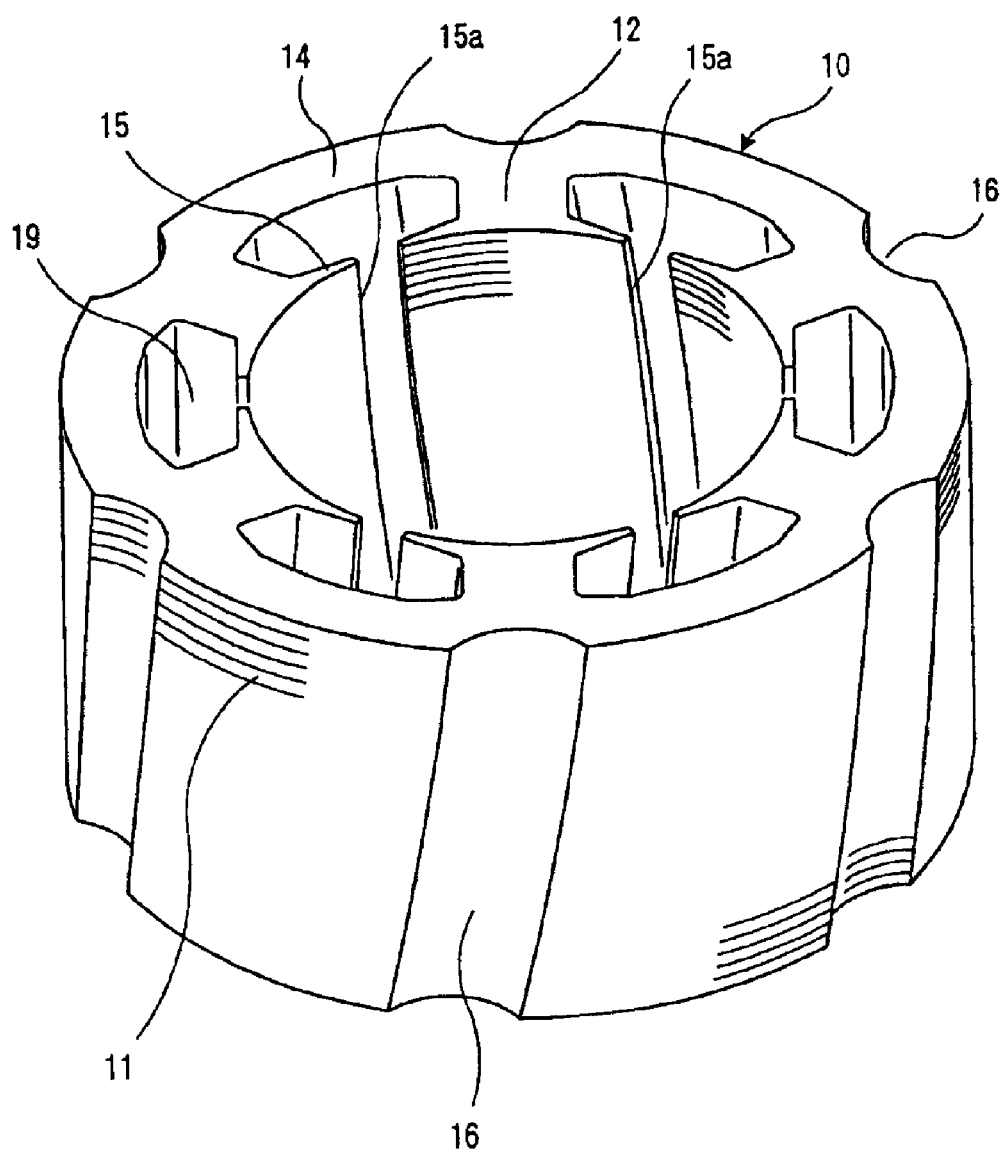
FIG. 2 is a perspective view of a stator of the embodiment.
Figure 3:
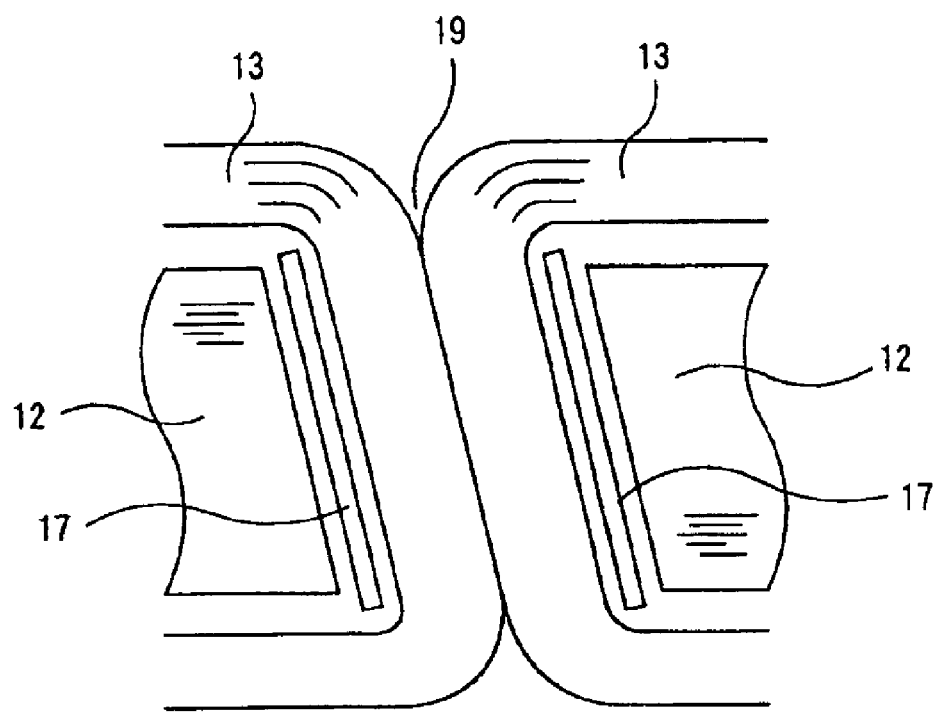
FIG. 3 is a sectional view taken along a line X–X' of FIG. 1, showing teeth and a groove for windings of stator-cores.
Figure 6:
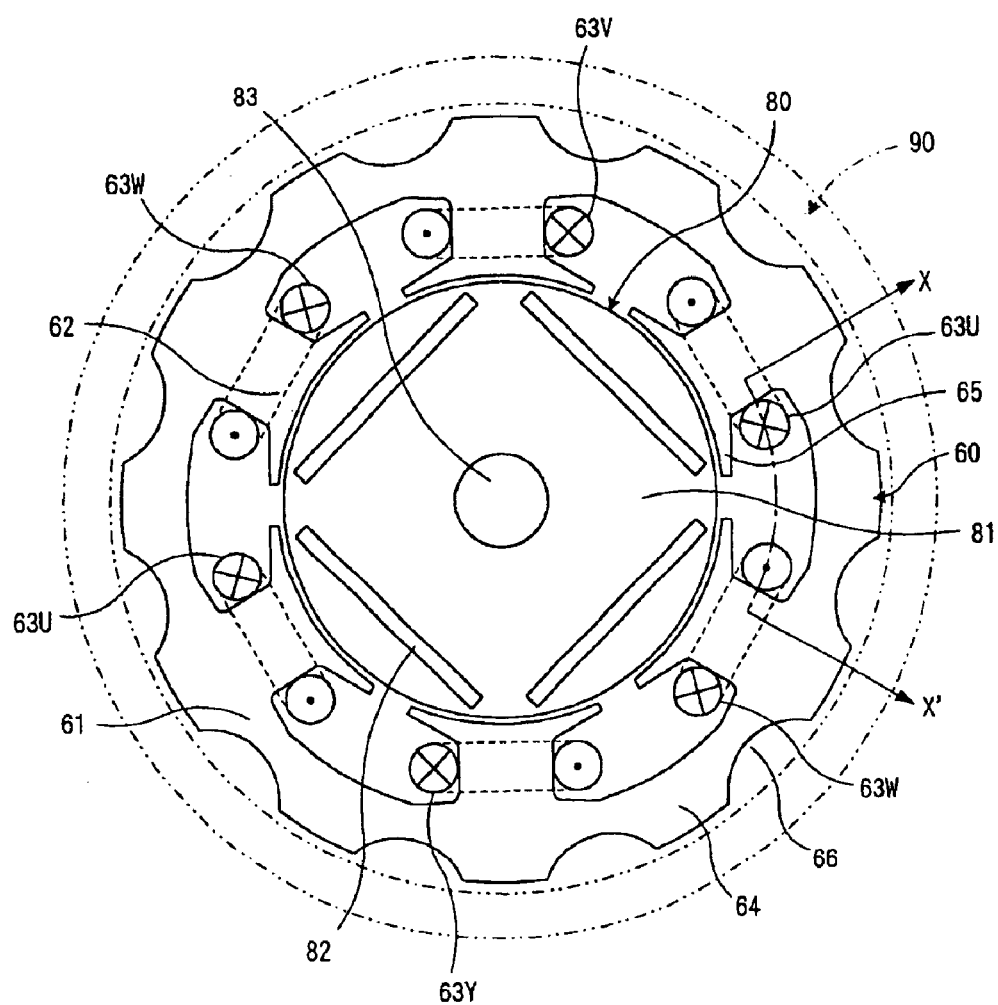
FIG. 6 is a sectional view of a conventional concentrated winding motor.
Figure 7:
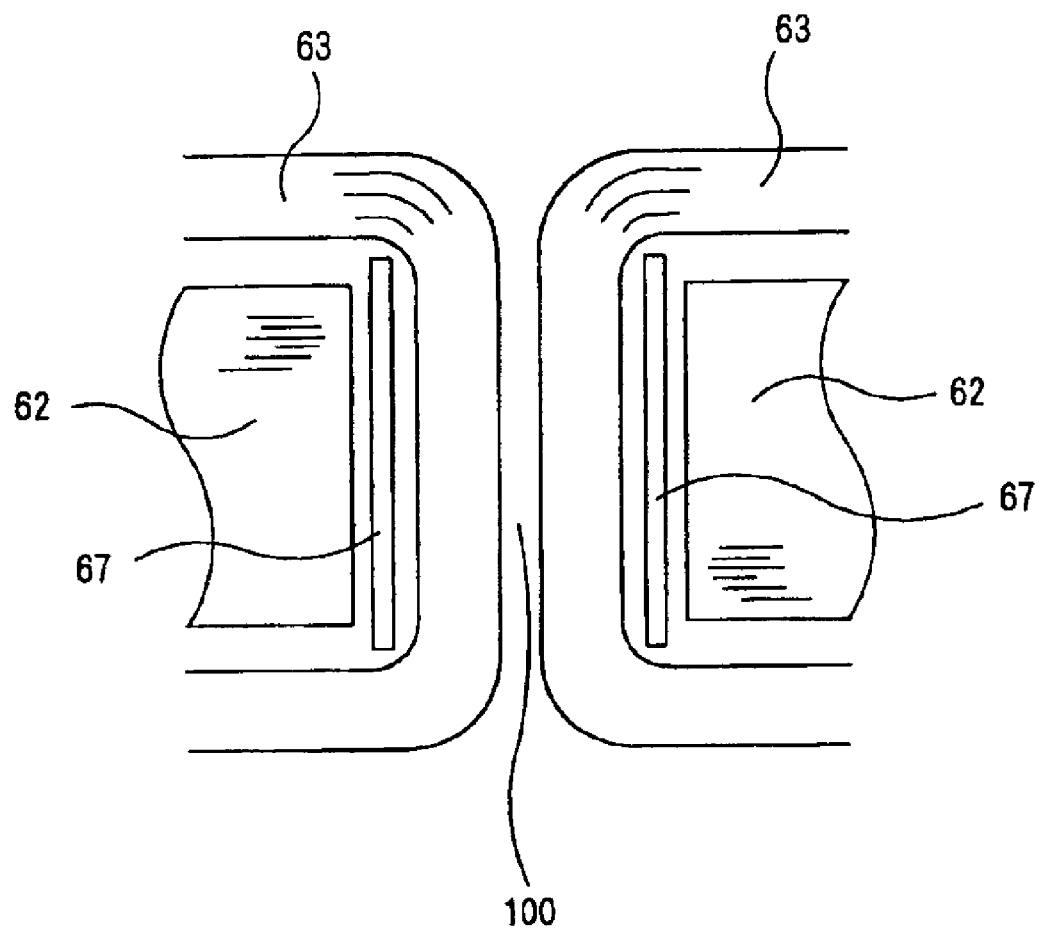
FIG. 7 is a sectional view taken along a line X–X' of FIG. 6, showing teeth and a groove for windings of stator-cores in the concentrated winding motor.
Figure 8:
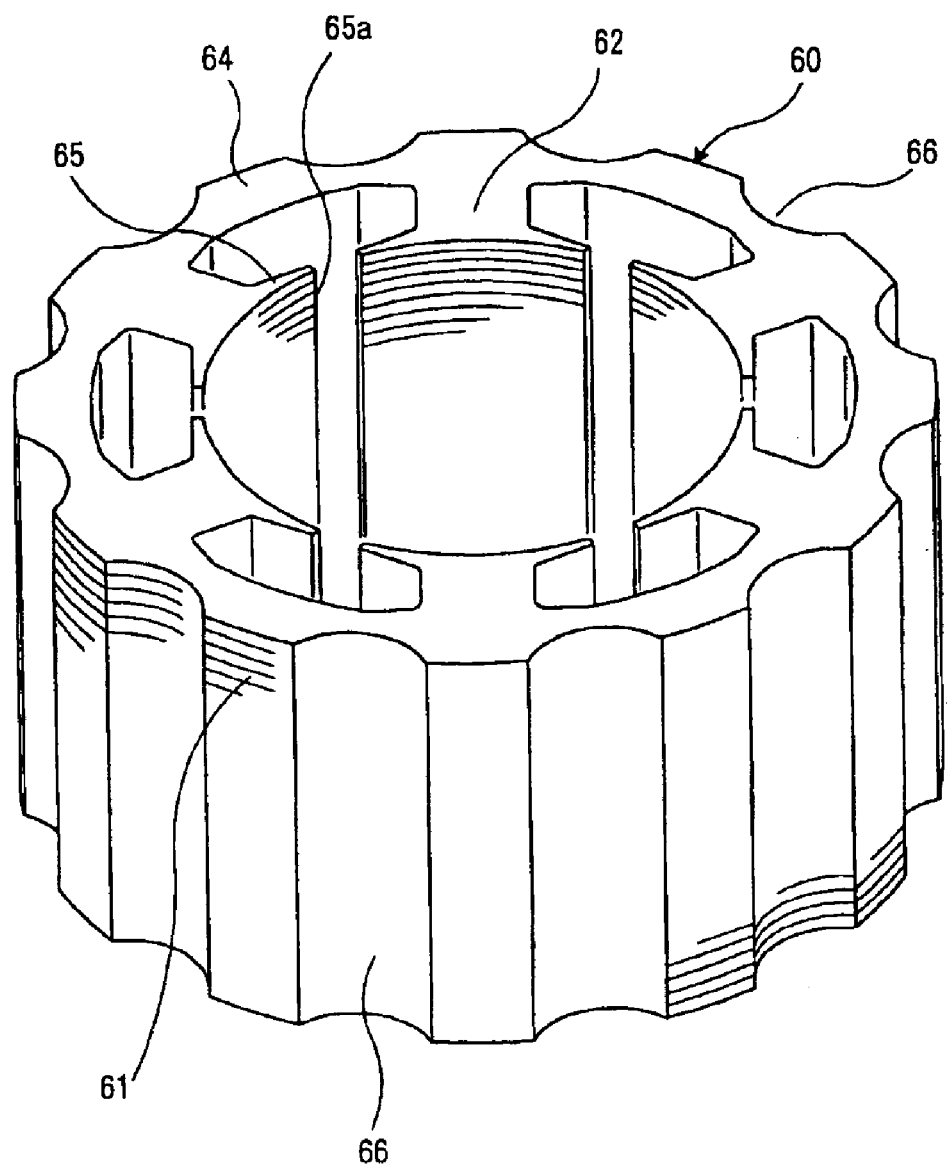
FIG. 8 is a perspective view of the stator-cores in the conventional concentrated winding motor.

FIGS. 1 to 3 show a concentrated winding motor according to the embodiment of the present invention. In the conventional concentrated winding motor shown in FIGS. 6 to 8, the stator-cores 61 are stacked in a straight line in the axial direction without forming skew. Thus, ends 65a of the teeth projecting tips 65 in a peripheral direction extend along the axial direction in straight lines. In the present embodiment, in stator-cores 11, ends 15a of teeth projecting tips 15 in a peripheral direction are stacked so as to be inclined with respect to the axial direction, so that skew is formed.

Further, as shown in FIG. 3, the winding state on the teeth is that windings 13—13 of different phases are brought into contact with each other in a groove for windings. The winding state is different from the conventional winding state of FIG. 7, in which an interval 100 is provided between the windings 63—63 of different phases in a groove for windings.

By the way, the present embodiment is equal to the prior art in the configuration of a stator, the connecting state of three-phase windings 13U, 13V, and 13W, and the driving state of the three-phase windings 13U to 13W or the like.

The following will discuss the detail of the present embodiment.

A motor of FIG. 1 that is used for a compressor of an air conditioner, a refrigerator, and so on is constituted by a stator 10 and a rotor 20. As shown in FIG. 3, in the stator 10, the three-phase windings 13U, 13V, and 13W are provided on six teeth 12, which are formed in the stator-cores 11, via insulating materials 17, each being formed as a film or an insulator or the like, between the winding 13 and the stator-cores 11.

Notches 16 are formed around the outer periphery of the stator-cores 11. In a state in which the stator 10 is shrink-fitted into a shell 90 of a compressor, the notches 16 act as through holes between the shell 90 and the stator-cores 11 and also act as passages of refrigerant.

The rotor 20 disposed in a hole formed in the stator-cores 11 has permanent magnets 22 embedded into a rotor core 21. Besides, the permanent magnets 22 are not limited to those of FIG. 1. For example, a plurality of magnets may be disposed (embedded) as reversed arcs at least in one layer or more.

FIG. 2 shows that skew is formed on the stator 10, which is constituted by the stacked flat stator-cores 11 of FIG. 1. Here, the constituent elements other than the stator cores 11, for example, the 13U, 13V, and 13W constituting the winding 13 are omitted in FIG. 2.

The stator-core 11 is constituted by the teeth 12 having the windings 13 thereon, teeth projecting tips 15 which face the outer periphery of the rotor 20 and are normally placed on the ends of the teeth 12 with a large width, and a yoke 14 which is substantially annular and connect the teeth 12.

The skewed stator-cores 11 are each slightly shifted from each other along the circumferential direction, and the ends 15a of the teeth projecting tips 15 are stacked so as to be inclined with respect to the axial direction, such structure herein being called a skew. Hence, irregular torque can be reduced. Further, considering that the strator-cores 11 have ribs for forming the teeth 12 on the internal diameter of a ring for forming a yoke 14 thereon, the ribs are inclined by the skew so as to reduce the occurrence of annular vibration.

However, noise and vibration is caused by exciting force in a radius direction, and particularly in the case of concentrated winding, attraction force between the adjacent teeth 12 affects noise and vibration. Thus, vibration cannot be sufficiently reduced only by forming skew.

FIG. 3 shows a state in which skew is formed on the stator 10 and the windings 13 stored in the same groove 19 for windings are brought into contact with each other such that stress is generated on the teeth 12 and the windings 13 wound around the teeth 12.

Here, "the state in which the windings 13 are brought into contact with each other" includes a state in which when an outer sheath having an insulating film wound thereon is selected as an outer sheath of the winding 13 before the winding 13 is wound and stored in the groove 19 for windings, the windings 13—13 are brought into contact with each other via the outer sheath films of the windings 13.

In this way, the windings 13 are brought into contact with each other to generate stress on the windings 13 and the teeth 12. Thus, it is possible to increase the strength and to reduce vibration of the windings 13 and the teeth 12.

Furthermore, with damper effect of the windings 13 which are brought into contact with each other, it is possible to suppress or reduce vibration on the teeth 12 and the windings 13, thereby reducing noise and vibration of the motor.

Here, an example of means for contacting the windings 13 each other will be discussed below. Before skew is formed, the windings 13 are provided on the teeth 12 of the stator-cores 11, in which stacked iron cores are temporarily fixed. Thereafter, skew is formed. When the formation of the skew is completed, the iron cores are fixed by means such as welding. The formation of the skew reduces the width of the groove 19 for windings. Hence, the adjacent windings 13 are brought into contact with each other by pressure, thereby generating stress for suppressing vibration on the windings 13 and the teeth 12.

Additionally, as the insulating material 17, particularly for use in a refrigerant of a hermetic compressor or the like, a film made of polyester is suitable. As a refrigerant, to be specific, HFC or the like is applicable, and natural refrigerant may be used.

In the case where a film is used as the insulating material 17 for insulating the stator-cores 11 and the windings 13, in order to obtain a space insulation distance between a coil end and an end face of the stator-cores 11 in the axial direction, it is preferable to fold both ends of the film in the axial direction with a prescribed width and allow the ends of the film to catch the ends of the stator-cores 11.

Moreover, the following configuration is also applicable: a film for insulating the stator-cores 11 and the windings 13 is disposed along the groove 19 for windings, and the end of the film is extended to simultaneously insulating the windings 13 of different phases in the same groove 19 for windings.

Besides, although the insulating material 17 is formed as a film, an insulator made of resin may be disposed along the groove 19 for windings to insulate the stator-cores 11 and the windings 13.

Next, the following will discuss an effective range of a skew angle.

Figure 5:
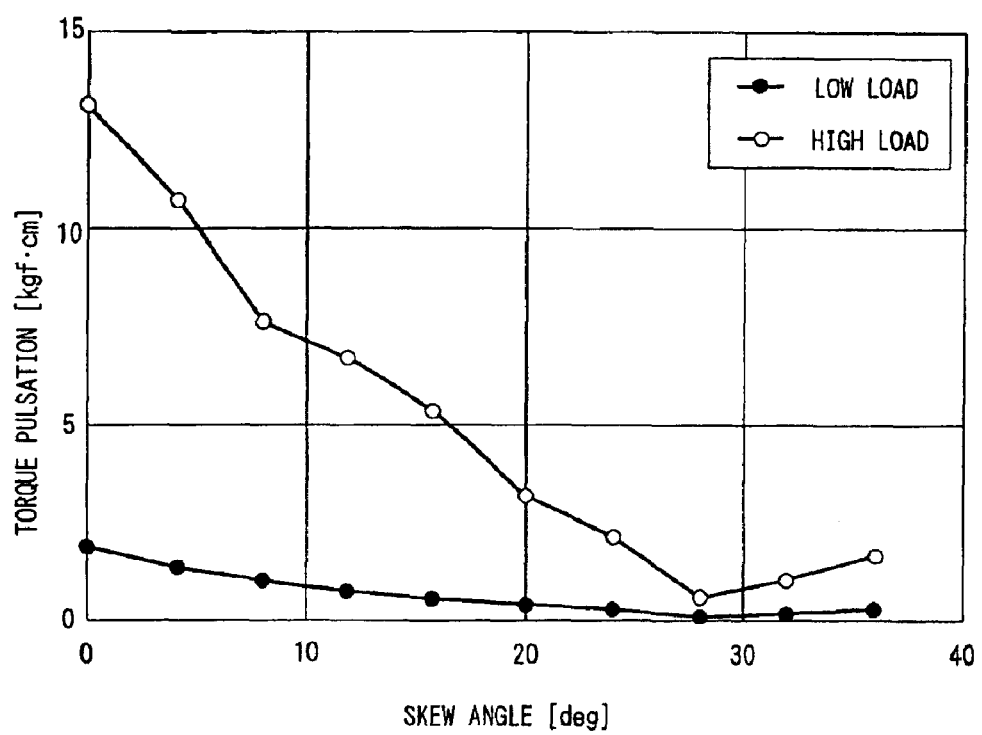
FIG. 5 is a characteristic diagram showing torque pulsation and the skew angle according to the embodiment.

FIG. 4 shows a relationship between displacement on the outer periphery of the stator-core (operating point of exciting force during an operation of the motor is set on an internal diameter of the stator) and a skew angle, and FIG. 5 shows a relationship between torque pulsation and a skew angle.

FIG. 4 shows that considering that the stator-cores 11 have protrusions for forming teeth 12, that is, ribs on the inside of the ring for forming the yoke 14, the ends 15a of the teeth projecting tips 15 are inclined at a skew angle of 4° or more in a circumferential direction so as to suppress annular vibration.

To be specific, FIG. 4 shows displacement on the outer periphery of the stator relative to any given fixed load. For example, as the load increases or decreases, a line of FIG. 4 vertically makes a parallel movement. It is found that at any load, displacement is held constant at a skew angle of 4°.

Furthermore, according to FIG. 5, it is confirmed that when the number of poles of the rotor 20 is Np=4, torque pulsation increases at a skew angle of 30 (120/Np)° or more. Therefore, a skew angle is set at not less than 4° nor more than (120/Np)°, so that a natural frequency of annular vibration rises while torque pulsation is reduced, and displacement of vibration on the stator-cores 11 decreases. Thus, vibration and noise can be reduced during an operation.

Besides, such motors can be used not only for a hermetic compressor but also for an actuator of a mobile unit (e.g. an automobile) and a refrigeration cycle of an air conditioner installed in a mobile unit. During drive performed by a battery installed in the same mobile unit, since the motor has high efficiency, it is possible to reduce power consumption of the battery. Moreover, since the motor has high efficiency, the motor can be smaller in size for obtaining the same output as compared with the prior art.

Further, in the above described embodiment, the skew is formed on the stator 10. The same effect can be expected by forming skew on the rotor 20 or both of the stator 10 and the rotor 20. To be specific, skew on the stator 10 and skew on the rotor 20 are opposite in inclining direction.

As described above, according to the present invention, skew is formed on at least one of the stator and the rotor, the windings of different phases are brought into contact with each other directly or via an insulating material in a groove for windings, and stress is applied to the windings and the teeth by the above contact so as to prevent vibration of the windings and the teeth. Hence, it is possible to provide a motor with low vibration and low noise.

Additionally, since the rotor has the permanent magnets embedded in the rotor core, it is possible to effectively use magnet torque resulted from the permanent magnet and reluctance torque resulted from saliency of the rotor, thereby achieving high efficiency of the motor.

Also, as to a skew angle, when the number of poles is Np, a relative skew angle formed by the stator and the rotor is set at not less than 4° nor more than (120/Np)°. Hence, annular vibration is suppressed, a natural frequency is increased, and displacement of vibration on the stator-cores is lowered, thereby reducing vibration and noise during an operation. In addition, when skew is formed on both of the stator and the rotor, a skew angle formed on each of them can be smaller, thereby improving the productivity.

Figure 9:
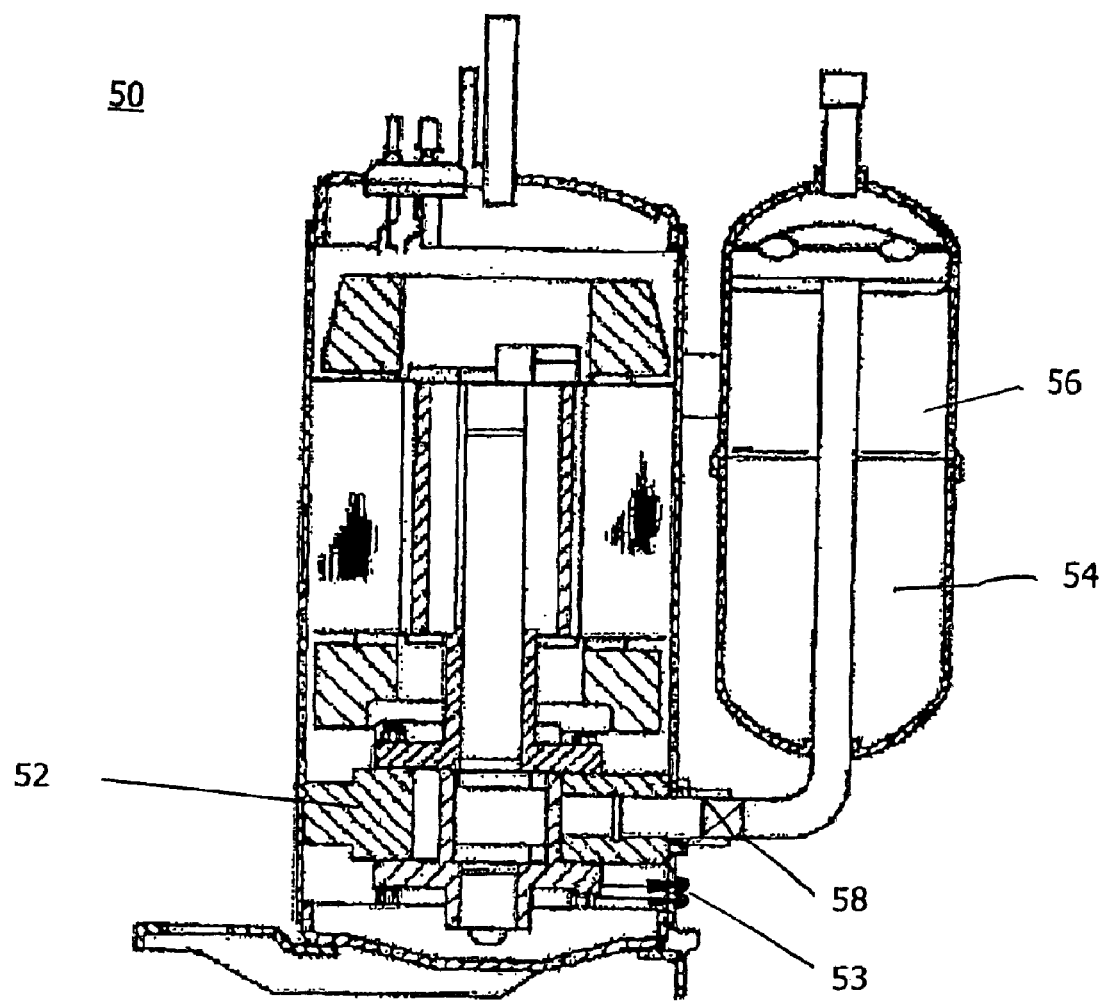
FIG. 9 is a sectional view of a hermatic compressor including the motor of FIG. 1.
Figure 10:
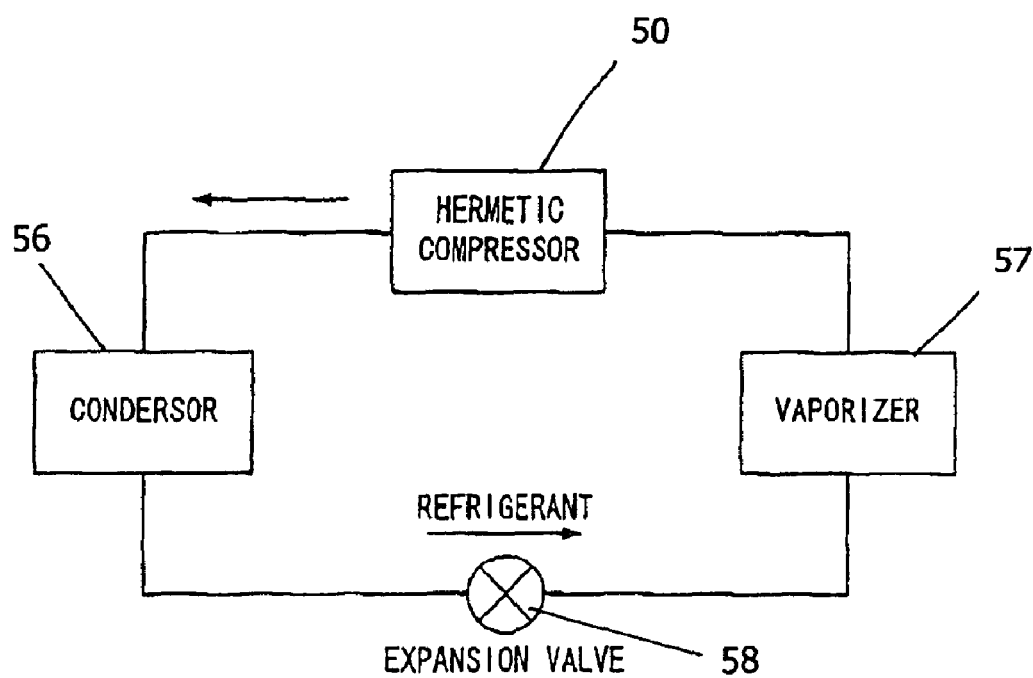
FIG. 10 is a schematic diagram of a refrigeration cycle using the hermatic compressor of FIG. 9.
Figure 11:
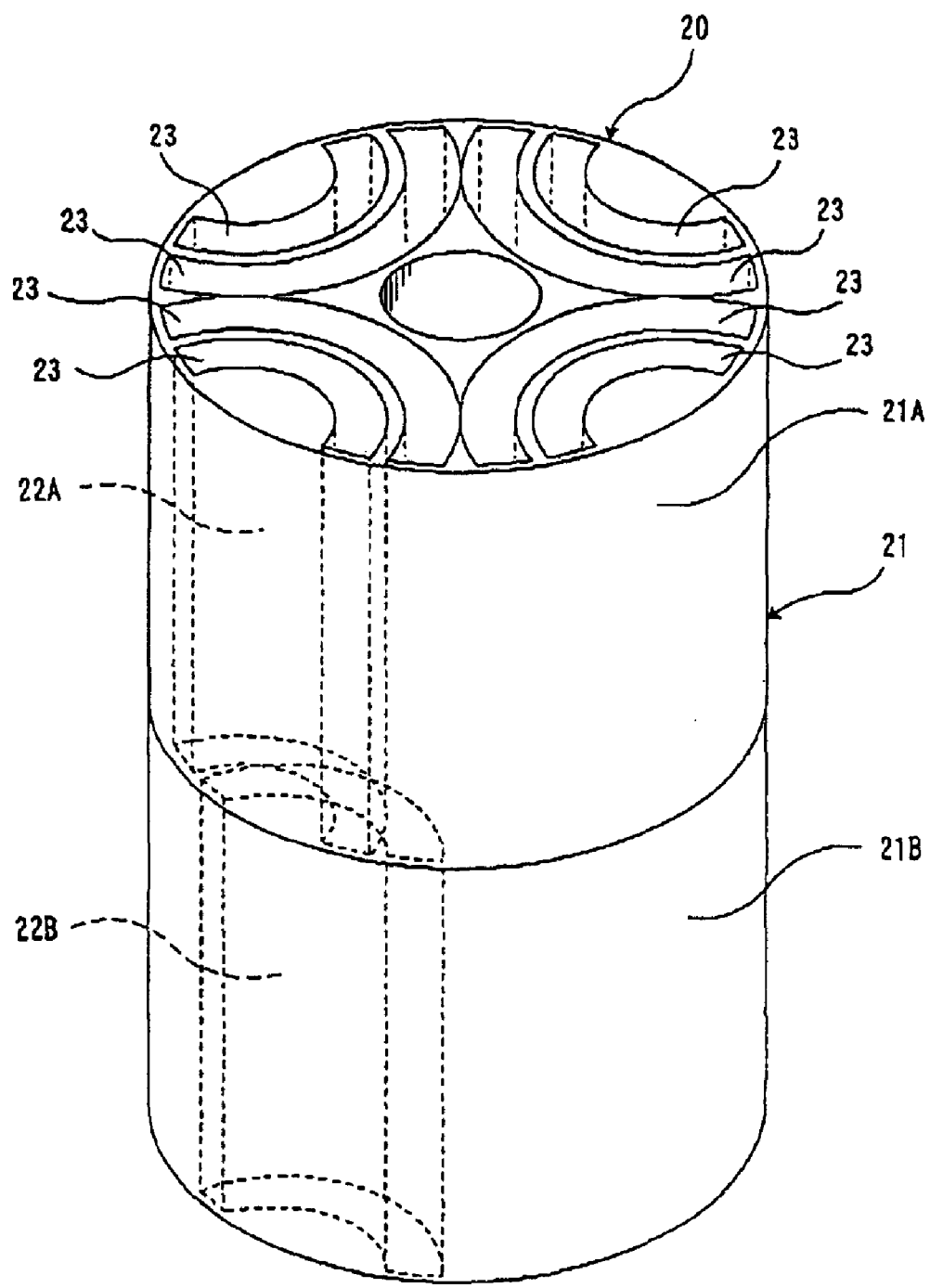
FIG. 11 is a perspective view of the rotor having portions inclined to form a skew.

FIG. 9 is a sectional view of a hermetic compressor 50 including the motor 52 corresponding to the motor shown in FIGS. 1–3. The motor 52 includes terminals 53 for connection to a power source. The compressor 50, according to known technology, utilizes a refrigerant 54 operating between the motor 52, the compressor 50, a condenser 56 and a vaporizer 57, as controlled by an expansion valve 58, as schematically shown in FIG. 10, describing the refrigeration cycle 59.

Further, in the case where a power supply for operating the motor is a battery, when voltage applied across the winding of the motor is 50 volts or less including 12 volts, 24 volts, or 42 volts, a long operation can be performed.

Also, the motor with the above unique effect according to the present invention is used for a hermetic compressor, an actuator of an automobile, a refrigeration cycle of the hermetic compressor, or a refrigeration cycle of an air conditioner in an automobile, so that vibration and noise of these devices can be reduced.

What is claimed is:

1. A motor in combination with a hermetic compressor, comprising:

a stator having a plurality of teeth radially located at intervals in a circumferential direction on an inner periphery of an annular yoke, each of said intervals serving as a groove for holding concentrated windings therein; and a rotor rotatably held opposite an inner periphery of said stator with a minimal gap therebetween, wherein at least one of said stator and said rotor comprises portions inclined to form a skew, and said windings of different phases are in contact with each other directly or via an insulating material in each of said grooves, whereby said contact allows stress to be applied to said windings and said teeth, thereby preventing vibration of said windings and said teeth, wherein terminals of said winding of said motor are for receiving a voltage of not greater than 50 volts.

2. The motor according to claim 1, wherein said rotor comprises permanent magnets embedded inside a rotor core.

3. The motor according to claim 1, wherein the number of poles of said rotor is Np, and a skew angle formed in said stator is not less than 4° nor more than $(120/Np)°$.

4. The motor according to claim 1, wherein the hermetic compressor includes HFC or a natural refrigerant as a refrigerant.

5. The motor according to claim 1, wherein said hermetic compressor is operable in a refrigeration cycle.

6. A motor comprising:

a stator having a plurality of teeth radially located at intervals in a circumferential direction on an inner periphery of an annular yoke, each of said intervals being a groove for holding concentrated windings therein; and a rotor rotatably held opposite an inner periphery of said stator with a minimal gap therebetween, wherein:

at least one of said stator and said rotor comprises portions inclined to form a skew, and said windings of different phases are in contact with each other directly or via an insulating material in each of said grooves, whereby said contact allows stress to be applied to said windings and said teeth, thereby preventing vibration of said windings and said teeth, said portions comprise stator-cores each having a location slightly shifted from a location of a neighboring stator-core along said circumferential direction, and said teeth comprise projecting tips stacked and inclined with respect to an axial direction of said annular yoke.

* * * * *

UNITED STATES PATENT AND TRADEMARK OFFICE
CERTIFICATE OF CORRECTION

PATENT NO.   : 6,870,293 B2
DATED        : March 22, 2005
INVENTOR(S)  : Hisakazu Kataoka et al.

It is certified that error appears in the above-identified patent and that said Letters Patent is hereby corrected as shown below:

<u>Title page,</u>
Item [73], Assignee, add -- Kabushiki Kaisha Toyota Jidoshokki (JP) --.

Signed and Sealed this

Twenty-first Day of March, 2006

JON W. DUDAS
*Director of the United States Patent and Trademark Office*